United States Patent
Ganiger et al.

(10) Patent No.: US 9,869,205 B2
(45) Date of Patent: Jan. 16, 2018

(54) BEARING OUTER RACE RETENTION DURING HIGH LOAD EVENTS

(71) Applicant: General Electric Company, Schenectady, NY (US)

(72) Inventors: Ravindra Shankar Ganiger, Bangalore (IN); Bruce Alan Carter, West Chester, OH (US); Nitin Deepak Rupnar, Bangalore (IN); Charles Andrew Corman, Milford, OH (US)

(73) Assignee: General Electric Company, Schenectady, NY (US)

( * ) Notice: Subject to any disclaimer, the term of this patent is extended or adjusted under 35 U.S.C. 154(b) by 247 days.

(21) Appl. No.: 14/948,917

(22) Filed: Nov. 23, 2015

(65) Prior Publication Data

US 2017/0145855 A1    May 25, 2017

(51) Int. Cl.
| | |
|---|---|
| F01D 25/16 | (2006.01) |
| F16C 35/04 | (2006.01) |
| F16C 35/067 | (2006.01) |
| F16C 27/04 | (2006.01) |

(52) U.S. Cl.
CPC ......... *F01D 25/162* (2013.01); *F01D 25/164* (2013.01); *F16C 27/045* (2013.01); *F16C 35/042* (2013.01); *F16C 35/067* (2013.01); *F05D 2220/32* (2013.01); *F05D 2240/54* (2013.01); *F16C 2360/23* (2013.01)

(58) Field of Classification Search
CPC .... F16C 27/04; F16C 27/045; F16C 2360/23; F01D 25/165
See application file for complete search history.

(56) References Cited

U.S. PATENT DOCUMENTS

| | | | |
|---|---|---|---|
| 1,626,188 A | 4/1927 | De Ram et al. | |
| 5,052,828 A | 10/1991 | Ciokajlo et al. | |
| 5,791,789 A | 8/1998 | Van Duyn et al. | |
| 6,413,046 B1 * | 7/2002 | Penn | F01D 21/045 384/202 |
| 6,540,483 B2 | 4/2003 | Allmon et al. | |
| 7,648,278 B2 | 1/2010 | Stout et al. | |
| 7,797,922 B2 | 9/2010 | Eleftheriou et al. | |
| 8,182,156 B2 | 5/2012 | Kinnaird et al. | |
| 8,282,285 B2 | 10/2012 | Brillon | |
| 8,322,038 B1 | 12/2012 | Heidari et al. | |
| 8,337,090 B2 | 12/2012 | Herborth et al. | |

(Continued)

FOREIGN PATENT DOCUMENTS

EP    2149681 A2    2/2010

*Primary Examiner* — Phillip A Johnson
(74) *Attorney, Agent, or Firm* — General Electric Company; Pamela A. Kachur (57) ABSTRACT

A housing for retention of the outer race of a bearing of a gas turbine engine includes an arrangement of spring fingers that yields a lightweight housing capable of withstanding very high radial loads combined with very high torsional windup and axial thrust load. Controlled circumferential gaps on both sides of each spring finger limit the deflection and self-arrest the distortion of the housing. An axial gap is created on the aft end by a portion of the spring finger beam structure that opposes an axial face of the housing and limits the axial distortion. A radial gap created between interface hardware of the housing and the inner retention housing also acts to retain the spring finger housing under load in a radial direction.

20 Claims, 9 Drawing Sheets

(56) References Cited

U.S. PATENT DOCUMENTS

| | | |
|---|---|---|
| 8,727,632 B2 | 5/2014 | Do et al. |
| 8,821,029 B2 | 9/2014 | Antunes et al. |
| 2003/0039538 A1 | 2/2003 | Allmon et al. |
| 2006/0204153 A1 | 9/2006 | Alam et al. |
| 2007/0031078 A1 | 2/2007 | Hackett |
| 2008/0152483 A1* | 6/2008 | Godleski ............... F01D 25/164 415/142 |
| 2011/0286836 A1 | 11/2011 | Davis |
| 2013/0108202 A1* | 5/2013 | Do ........................ F01D 25/164 384/572 |
| 2013/0280063 A1* | 10/2013 | Ganiger ................. F16C 19/54 415/229 |
| 2013/0331223 A1 | 12/2013 | McCune et al. |

\* cited by examiner

FIG. 17

BEARING OUTER RACE RETENTION DURING HIGH LOAD EVENTS

FIELD OF THE INVENTION

The present subject matter relates generally to a bearing in a gas turbine engine, or more particularly to an apparatus and method for retention of the outer race of the bearing.

BACKGROUND OF THE INVENTION

A gas turbine engine generally includes a fan and a core arranged in flow communication with one another with the core disposed downstream of the fan in the direction of the flow through the gas turbine. The core of the gas turbine engine generally includes, in serial flow order, a compressor section, a combustion section, a turbine section, and an exhaust section. With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), which also is known as the high pressure spool (HP spool). Similarly, the LP compressor is coupled with the LP turbine via a low pressure shaft (LP shaft), which also is known as the low pressure spool (LP spool).

In operation, at least a portion of air over the fan is provided to an inlet of the core. Such portion of the air is progressively compressed by the LP compressor and then by the HP compressor until the compressed air reaches the combustion section. Fuel is mixed with the compressed air and burned within the combustion section to provide combustion gases. The combustion gases are routed from the combustion section through the HP turbine and then through the LP turbine. The flow of combustion gasses through the turbine section drives the HP turbine and the LP turbine, each of which in turn drives a respective one of the HP compressor and the LP compressor via the HP shaft (aka HP spool) and the LP shaft (aka LP spool). The combustion gases are then routed through the exhaust section, e.g., to atmosphere.

During normal engine operation, a ball bearing assembly can be provided to act to retain the axial position of the HP shaft (aka HP spool), and a roller bearing 80 assembly can be provided to act to provide radial damping of the fan/rotor system. A traditional design approach consisting of an axial spring finger housing combined with a radial squeeze film oil damper can be provided to protect the bearings against damage during relatively small unbalance load situations. During these normal operating conditions, the squeeze film damper bearing requires clearance in all directions around the bearing (radial, tangential & axial) for dynamic operation. However, such axial spring finger housing contains relatively long axial spring fingers for retention of the ball bearing housing, and the long spring fingers take up space in the engine housing, add weight to the engine, have limited torsional load capability and are complicated for manufacture.

Moreover, in a failure mode that results from either a liberated fan blade, a liberated compressor blade or a liberated turbine blade, very high radial loads combined with very high torsional windup provide significant design challenges to the bearings and to the spring finger housing for the ball bearing. The radial load closes the damper gap and the radial bumper gap and creates a harmonic drive effect that loads the spring fingers in torsion. This torsion load on the bearing and its retention housing structure results in an opposing sinusoidal load distribution that twists the spring fingers enough so that the spring fingers develop cracks, which are very undesirable.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a housing structure for retention of the outer race of a ball bearing that acts to retain the axial position of the HP shaft has spring fingers that are flat and short. The retention housing includes a spring finger housing connected to a ball bearing housing that is disposed radially inwardly from the spring finger housing. The spring finger housing includes a plurality of spring fingers that are connected to the ball bearing housing and inter-digitated in the circumferential direction with a plurality of struts. Circumferential gaps on each of the opposite circumferential edges of each of the spring fingers limit the circumferential deflections of the spring fingers and self-arrest the distortion of the spring finger structure. Between the aft end of each spring finger and a portion of the aft end of the spring finger housing, there is defined an axial gap that serves to limit the axial distortion of the retention housing structure. Between the inner diametrical face of each finger and the ball bearing housing, there is defined a radial gap that acts to retain the spring finger housing in a radial direction. Each of the circumferential gaps, axial gaps and radial gaps is controlled according to the anticipated load in consideration of the retention housing structure's size and material composition. The resulting design of the spring finger housing integrates the structural components such that they become capable of withstanding the torsional windup and high radial loads that occur with the sudden increase in load that accompanies a blade failure, whether a fan blade, a compressor blade or a turbine blade. Moreover, due to the unique tapered and short spring finger design, the amount of axial and radial space needed for the spring finger housing is reduced along with a concomitant reduction in the weight of the retention housing structure while affording a very high torsional load capability to the retention housing structure.

In another exemplary embodiment of the present disclosure, a gas turbine engine includes a compressor section having at least one compressor and a turbine section located downstream of the compressor section and including at least one turbine. The compressor section can include a low pressure compressor and a high pressure compressor downstream of the low pressure compressor. The turbine section includes a high pressure (HP) turbine and a low pressure (LP) turbine downstream of the HP turbine. The gas turbine engine also includes a high pressure shaft mechanically coupling the high pressure compressor to the high pressure turbine via a ball bearing and which includes a retention housing for the outer race of the ball bearing. The retention housing includes a spring finger housing with interdigitated struts and fingers as summarily described above and in more detail hereinafter with various alternative embodiments. Moreover, embodiments of the retention housing including a spring finger housing with interdigitated struts and fingers as summarily described above and in more detail hereinafter with various alternative embodiments also can be applied to systems with a low pressure shaft that need to address similar challenges with ball bearing components.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF ILLUSTRATIVE EMBODIMENTS

Reference will now be made in detail to present embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of any claims and their equivalents. The detailed description uses numerical and letter designations to refer to features in the drawings. Like or similar designations in the drawings and description have been used to refer to like or similar parts of the invention, and identical numerals indicate the same elements throughout the drawings. As used herein, the terms "first", "second", and "third" may be used interchangeably to distinguish one component from another and are not intended to signify location or relative importance of the individual components.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200.Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the fluid can be a gas such as air or a liquid such as a lubricant or liquid fuel.

Figure 1:
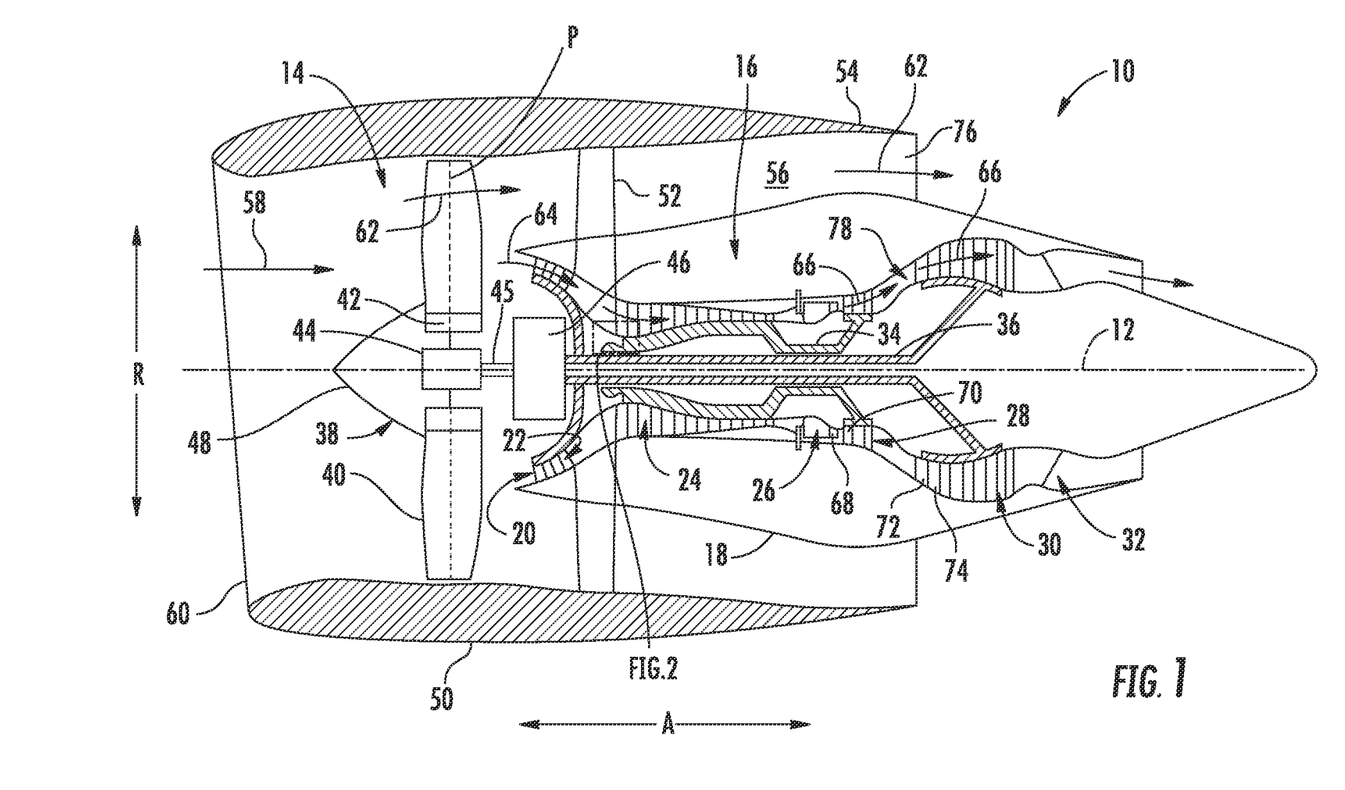
FIG. 1 is a schematic cross-sectional view of an exemplary gas turbine engine according to various embodiments of the present disclosure.
Figure 3:
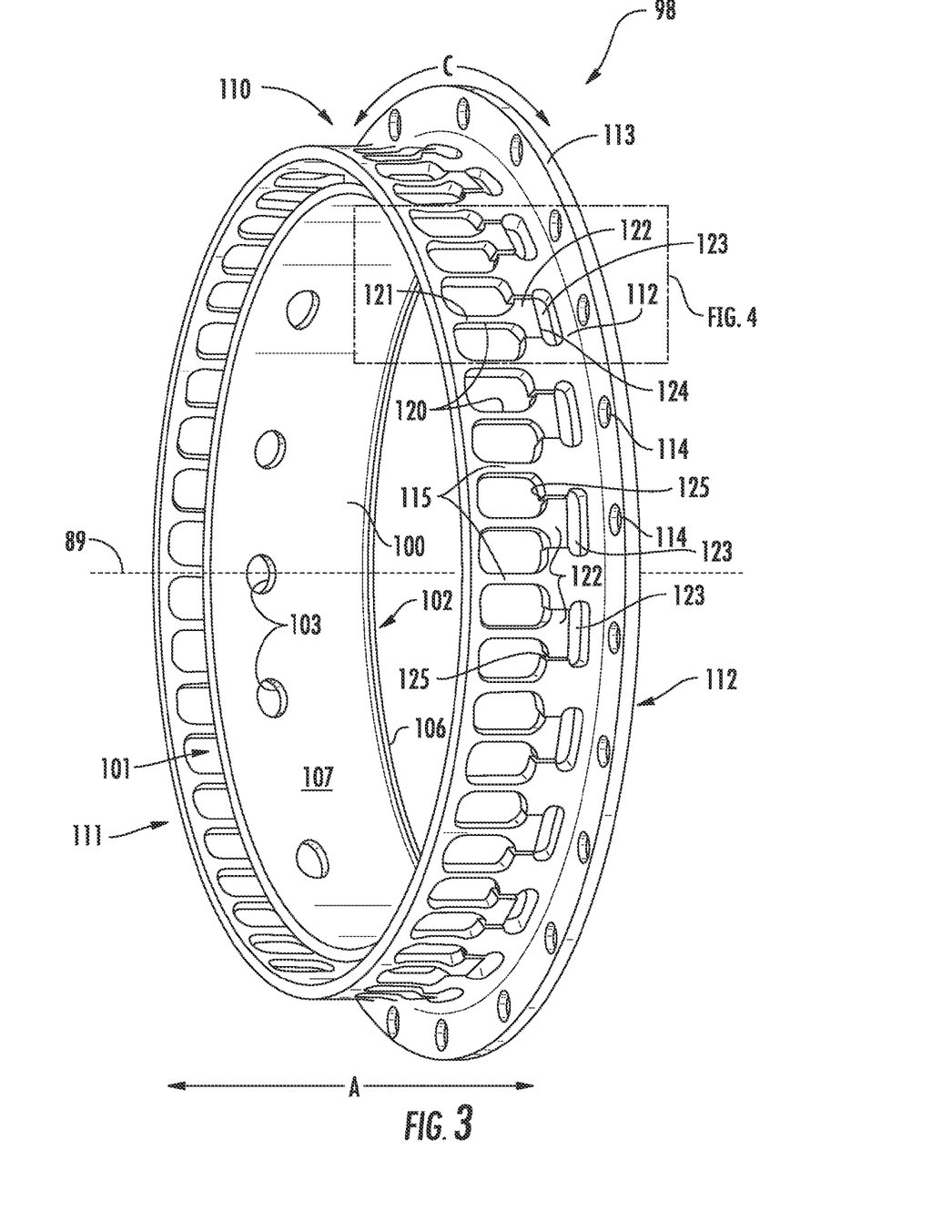
FIG. 3 is a perspective view of an exemplary embodiment of the retention housing component schematically depicted in FIG. 2.

Referring now to the drawings, FIG. 1 is a schematic cross-sectional view of a gas turbine engine that provides a typical environment in which one expects to find exemplary embodiments of the present disclosure. More particularly, for the embodiment of FIG. 1, the gas turbine engine is a high-bypass turbofan jet engine 10, referred to herein as "turbofan engine 10." Such engines typically embody a cylindrical symmetry. As shown in FIG. 1, the turbofan engine 10 defines an axial direction A (extending parallel to a longitudinal centerline 12 provided for reference) and a radial direction R that is normal to the axial direction A. As schematically shown in FIG. 3 for example, the circumferential direction C revolves 360° around the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. As schematically shown in FIG. 1, the outer casing 18 encases, in serial flow relationship, a compressor section including a booster or low pressure (LP) compressor 22 followed downstream by a high pressure (HP) compressor 24; a combustion section 26; a turbine section including a high pressure (HP) turbine 28 followed downstream by a low pressure (LP) turbine 30; and a jet exhaust nozzle section 32. A high pressure (HP) shaft or spool 34 drivingly connects the HP turbine 28 to the HP compressor 24 to rotate them in unison concentrically with respect to the longitudinal centerline 12. A low pressure (LP) shaft or spool 36 drivingly connects the LP turbine 30 to the LP compressor 22 to rotate them in unison concentrically with respect to the longitudinal centerline 12. The compressor section, combustion section 26, turbine section, and nozzle section 32 together define a core air flowpath.

For the embodiment depicted in FIG. 1, the fan section 14 includes a variable pitch fan 38 having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 via a fan shaft 45 that is powered by the LP shaft 36 across a power gear box 46. The power gear box 46 includes a plurality of gears for adjusting the rotational speed of the fan shaft 45 and thus the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Alternatively, the nacelle 50 also may be supported by struts of a structural fan frame. Moreover, a downstream section 54 of the nacelle 50 may extend over an outer portion of the core turbine engine 16 so as to define a bypass airflow groove 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrow 62 is directed or routed into the bypass airflow groove 56, and a second portion of the air 58 as indicated by arrow 64 is directed or routed into the upstream section of the core air flowpath, or more specifically into the inlet 20 of the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where the highly pressurized air is mixed with fuel and burned to provide combustion gases 66.

The combustion gases 66 are routed into and expand through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed into and expand through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow groove 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it also should be appreciated that in other exemplary embodiments, any other suitable HP compressor 24 and HP turbine 28 configurations may be utilized. It also should be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc., as well as turbine engines used for other vehicles or in stationary applications.

Figure 2:
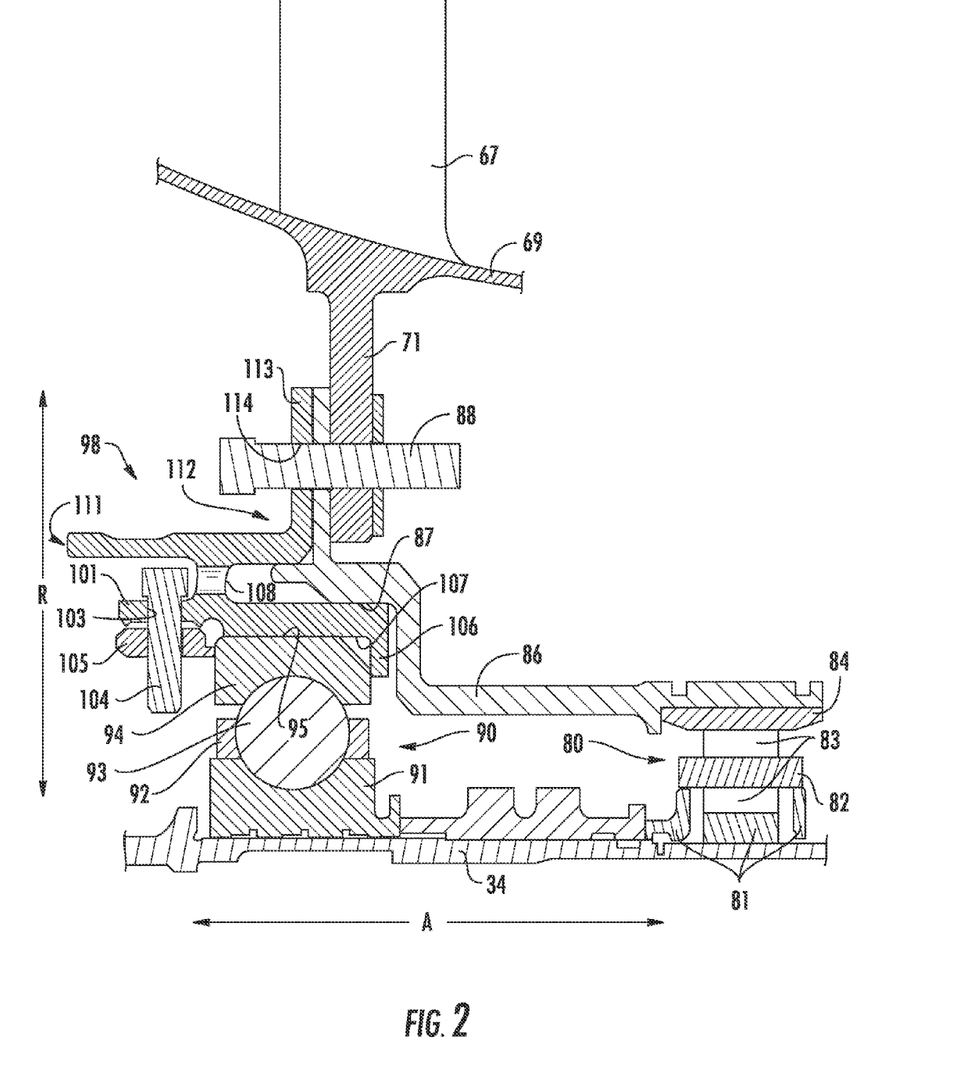
FIG. 2 is an exploded, schematic cross-sectional view of components within the dashed outline of the box designated FIG. 2 in FIG. 1.

FIG. 2 presents an exploded, schematic cross-sectional view of components within the dashed outline of the box designated FIG. 2 in FIG. 1. One end of a stator vane 67 of the HP compressor 24 is mounted to a stationary structural frame 69, while the opposite end of the stator vane 67 is truncated in the view shown in FIG. 2 but would be held fixed with respect to the outer casing 18. A flange 71 is connected to and depends radially inwardly from the stationary structural frame 69. The inner ring 81 of a roller bearing 80 is non-rotatably coupled to the HP spool 34. The roller bearing 80 includes a cage 82, a plurality of rollers 83 (only one roller 83 being depicted in the view shown in FIG. 2) and an outer ring 84. As schematically shown in FIG. 2, interface hardware 86 non-rotatably couples the outer ring 84 of the roller bearing 80 to the flange 71 of the stationary structural frame 69 via a mechanical fastener such as a bolt 88. The inner ring 91 of a ball bearing 90 is non-rotatably coupled to the HP spool 34. The ball bearing 90 also includes a cage 92, balls 93 (only one ball 93 being shown in the view of FIG. 2) and an outer ring 94 that is disposed radially outwardly farther away from the axis of rotation 12 than the disposition of the inner ring 91.

Figure 4:
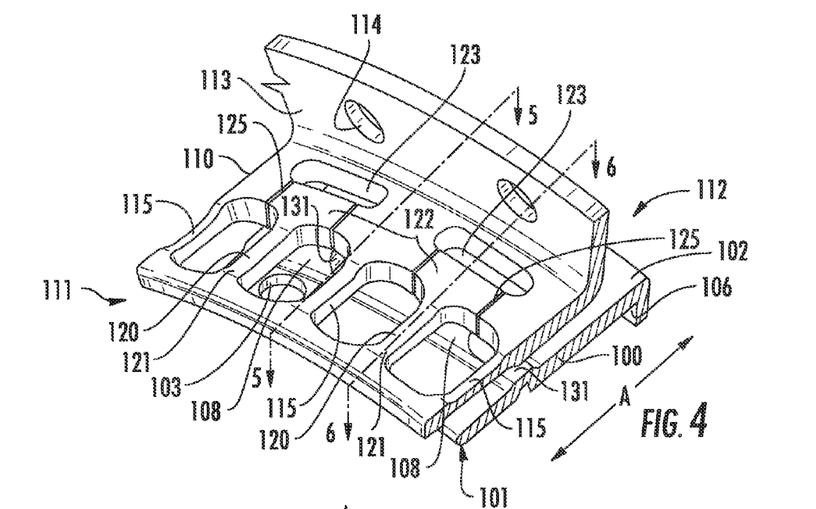
FIG. 4 is a perspective view of the section within the dashed outline of the box designated FIG. 4 in FIG. 3 of the exemplary embodiment of the retention housing component depicted in FIG. 3.

In accordance with an embodiment of the present invention, a retention housing 98 is generally designated by the numeral 98 in FIGS. 2 and 3 and configured and disposed for retaining the ball bearing 90 and absorbing the loads that result from a failure of a fan blade, a compressor blade or a turbine blade when any such blade suffers any compromise of its structural integrity, e.g., becomes at least partially detached or broken. As shown in FIG. 3 for example, the retention housing 98 desirably includes a ball bearing housing 100 and a spring finger housing 110 disposed radially outwardly from the ball bearing housing 100 and concentrically around the ball bearing housing 100 with respect to a central rotational axis 89 of the retention housing 98. As schematically shown in FIGS. 3 and 4 for example, the ball bearing housing 100 defines its own forward end 101, which is disposed axially apart from its own aft end 102. Similarly, as schematically shown in FIGS. 3 and 4 for example, the spring finger housing 110 defines its own forward end 111, which is disposed axially apart from its own aft end 112.

As schematically shown in FIG. 2 for example, the retention housing 98 non-rotatably couples to the flange 71 of the stationary structural frame 69, the outer ring 94 of the ball bearing 90 for a high pressure spool 34 of a gas turbine engine 10. The spring finger housing 110 can be fixed with respect to the outer casing 18 as by being mechanically bolted or welded to the flange 71. In one exemplary embodiment, the spring finger housing 110 is rendered stationary by being coupled to the outer casing 18 in a manner that can be performed in any of a number of conventional manners, any one of which being suitable for purposes of illustrating exemplary embodiments of the present disclosure. As shown in FIG. 2 for example, this can be accomplished via an annular mounting flange 113 that elongates generally in a radial direction from the aft end 112 of the spring finger housing 110. The spring finger housing 110 and the annular mounting flange 113 desirably are formed as a monolithic structure.

As shown in FIG. 3, the annular mounting flange 113 is drilled with a plurality of axially extending mounting holes 114 therethrough. As shown in FIG. 2 for example, each of the mounting holes 114 through the annular mounting flange 113 of the retention housing 98 desirably is configured to receive a respective mounting bolt 88 (one of which being depicted in cross-section in the view of FIG. 2) by which the mounting flange 113 may be attached to the flange 71 of the stationary structural frame 69. As shown in FIG. 2 for example, the annular mounting flange 113 non-rotatably couples the spring finger housing 110 to the flange 71 of the stationary structural frame 69 via a mechanical fastener such as a bolt 88, which enables the retention housing 98 to be removed from the engine 10 for replacement, maintenance and/or repair.

Figure 5:
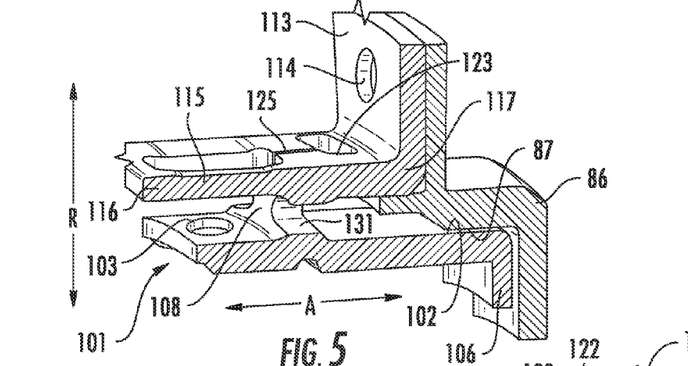
FIG. 5 is a cross-sectional view of the edges exposed to the viewer after a cut made in the direction of the arrows designated 5-5 in FIG. 4.

As shown in FIGS. 3 and 5 for example, the forward end 101 of the ball bearing housing 100 is provided with a plurality of openings 103. Each such opening 103 is configured to receive therein an attachment bolt 104 such as depicted in cross-section in FIG. 2 and which is locked by a retention nut 105. The ball bearing housing 100 includes a retention flange 106, which extends radially inwardly toward the central axis 89 from the aft end 102 of the ball bearing housing 100. As shown in FIG. 2 for example, the outer ring 94 of the ball bearing 90 is restrained against axial movement by being held between the retention flange 106 of the ball bearing housing 100 and the retention nut 105. Accordingly, under normal operating conditions of the engine 10, the outer ring 94 of the ball bearing 90 becomes restrained against axial movement with respect to the HP spool 34. As schematically shown in FIGS. 2 and 3, the ball bearing housing 100 defines a cylindrical inner surface 107 that is disposed equidistantly from the central axis of rotation 89 that extends in an axial direction. As shown in FIG. 2 for example, this inner surface 107 of the ball bearing housing 100 of the retention housing 98 desirably contacts the cylindrically shaped outer surface 95 of the outer ring 94 of the ball bearing 90.

As schematically shown in FIGS. 3, 4 and 5 for example, the spring finger housing 110 defines a plurality of axially extending struts 115. As schematically shown in FIG. 5 for example, each strut 115 defines a forward end 116 and an aft end 117 disposed axially spaced apart from and opposite to the forward end 116 of each respective strut 115. Desirably, the plurality of struts 115 forms a monolithic structure with the spring finger housing 110.

Figure 6:
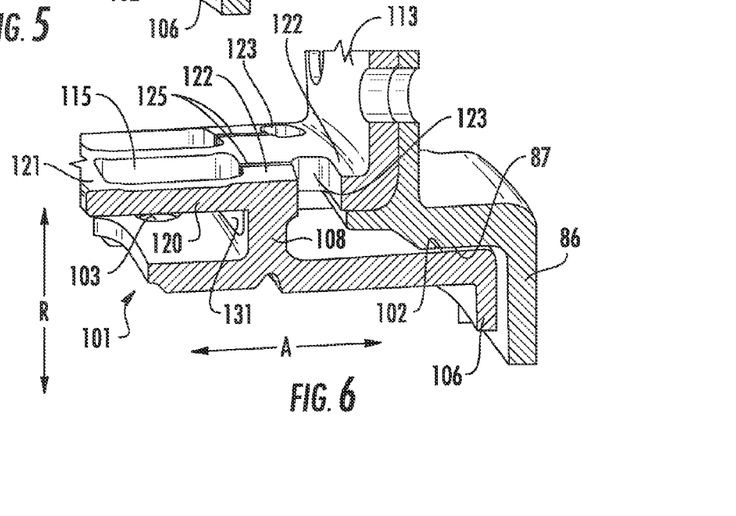
FIG. 6 is a cross-sectional view of the edges exposed to the viewer after a cut made in the direction of the arrows designated 6-6 in FIG. 4.

As schematically shown in FIGS. 3, 4 and 6 for example, the spring finger housing 110 defines a plurality of axially extending fingers 120. Each finger 120 defines a forward end 121 and an aft end 122 disposed axially spaced apart from and opposite to the forward end 121 of each respective finger 120. Desirably, the plurality of forward ends 111 of the fingers 120 form a monolithic structure with the spring finger housing 110.

As shown in FIG. 3 for example, the struts 115 and the fingers 120 are interdigitated around the spring finger housing 110 in a circumferential direction schematically indicated by the arrows designated by the letter C. In other words, single ones of the fingers 120 alternate with single ones of the struts 115 as one proceeds circumferentially around the spring finger housing 110.

As schematically shown in FIGS. 5 and 6 for example, each of the struts 115 and fingers 120 includes an intermediate portion that extends axially between each respective front end 116, 121 and respective aft end 117, 122 of each respective strut 115 and finger 120. Each of these intermediate portions is narrower than each respective front end 116, 121 and respective aft end 117, 122 of each respective strut 115 and finger 120. Each respective strut 115 and finger 120 undergoes a tapering from each opposite end of each respective strut 115 and finger 120 to a certain degree until the narrowed dimension of that respective strut 115 or finger 120 is attained. Each opposite circumferential side and top and bottom surface of each strut 115 and finger 120 can be machined to attain the desired tapering. The specific relative dimensions of the intermediate portions with respect to the front ends 116, 121 and aft ends 117, 122 will depend upon the dimensions and composition of the retention housing 98 as well as the anticipated level of stress for which the retention housing 98 is being engineered.

In a typical case, the stress that is to be absorbed by the fingers 120 will be greater than the stress that is anticipated to be borne by the struts 115, and in such a typical case the fingers 120 will be tapered to a lesser degree than the struts 115, and thus the fingers 120 overall will be thicker than the struts 115. However, it is anticipated that there may be some applications in which the opposite would be desired so that struts 115 would be thicker than the fingers 120, even though in both cases there would be some tapering of the fingers 120 and struts 115. Because of this tapering of the fingers 120 and struts 115, the axial lengths of the respective struts 115 and fingers 120 can be shortened relative to the lengths of conventional fingers and struts. Additionally, the tapering of the fingers 120 and struts 115 results in a reduction in the overall weight of the retention housing 98 when compared to a conventional retention housing.

As schematically shown in FIGS. 3, 4, 6, 9 and 10 for example, the aft end 122 of each of the plurality of fingers 120 defines an aft edge 124 that is spaced apart from the aft end 112 of the spring finger housing 110 and defines an axial gap 123 located between the aft edge 124 of the respective finger 120 and the aft end 112 of the spring finger housing 110.

Figure 10:
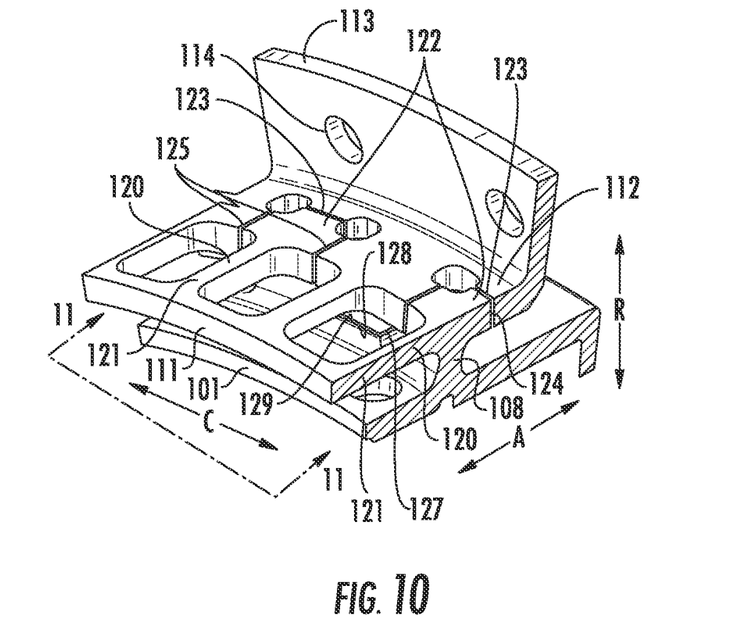
FIG. 10 is a schematic representation of an alternative embodiment of a section of a retention housing component depicted in FIG. 3 taken from a view similar to the view shown in FIG. 4.

As schematically shown in FIGS. 2, 4, 5, 6, 10 and 11 for example, each embodiment of the retention housing 98 desirably includes a plurality of bridge webs 108. Each bridge web 108 extends in the radial direction (R) between the ball bearing housing 100 and the spring finger housing 110 and connects the ball bearing housing 100 to the spring finger housing 110. As shown in FIGS. 2, 6 and 10 for example, each bridge web 108 desirably is connected to the spring finger housing 110 closer to the axial midpoint of the spring finger housing 110 than to either the forward end 111 or the aft end 112 of the spring finger housing 110.

As shown in FIGS. 4, 5, 6 and 11 for example, a separate bridge web 108 connects the ball bearing housing 100 to a respective one of the plurality of fingers 120 of the spring finger housing 110. However, none of the struts 115 of the spring finger housing 110 is connected to the ball bearing housing 100 by a radially extending bridge web 108. In the embodiment depicted in FIGS. 4 and 5 for example, circumferentially extending oblong-shaped undercuts 131 are disposed beneath the respective struts 115 to separate the struts 115 of the spring finger housing 110 from the ball bearing housing 100.

Figure 11:
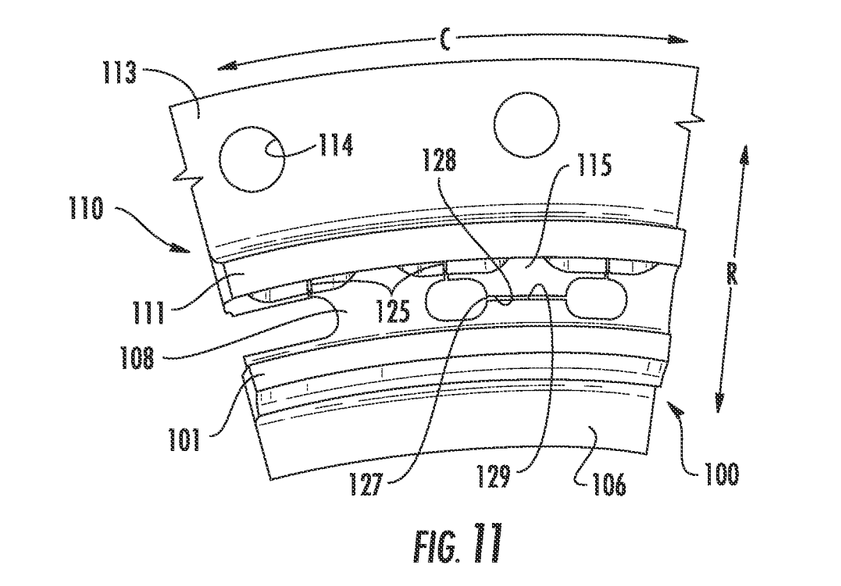
FIG. 11 is a schematic representation of a view of the section of the retention housing component depicted in FIG. 10 but taken from a view sighting along the radial direction (R) designated in FIG. 10.

In the embodiment depicted in FIGS. 10 and 11 for example, instead of oblong-shaped undercuts 131, circumferentially extending radial gaps 127 are disposed beneath the respective struts 115 to separate the struts 115 of the spring finger housing 110 from the ball bearing housing 100. These radial gaps 127 are defined between an inner circumferentially extending edge 128 of the inner surface of the strut 115 and the opposing circumferentially extending edge 129 of the ball bearing housing 100.

As shown in FIGS. 8, 9, 16 and 17 for example, the aft end 122 of each of the plurality of fingers 120 defines a pair of axially extending side edges 126 that are spaced apart circumferentially from each other. Each side edge 126 of the aft end 122 of each finger 120 is spaced apart from an opposing axially extending side edge 118 of the adjacent strut 115 in the proximity of the aft end 112 of the spring finger housing 110 and defines a relatively small circumferential gap 125 (See also FIGS. 3, 4, 5 and 10) between the respective opposing side edges 118, 126 in the vicinity of the aft end 112 of the spring finger housing 110. These circumferential gaps 125 measure on the order of a range of 5 thousandths of an inch to 20 thousandths of an inch, inclusive.

Figure 9:
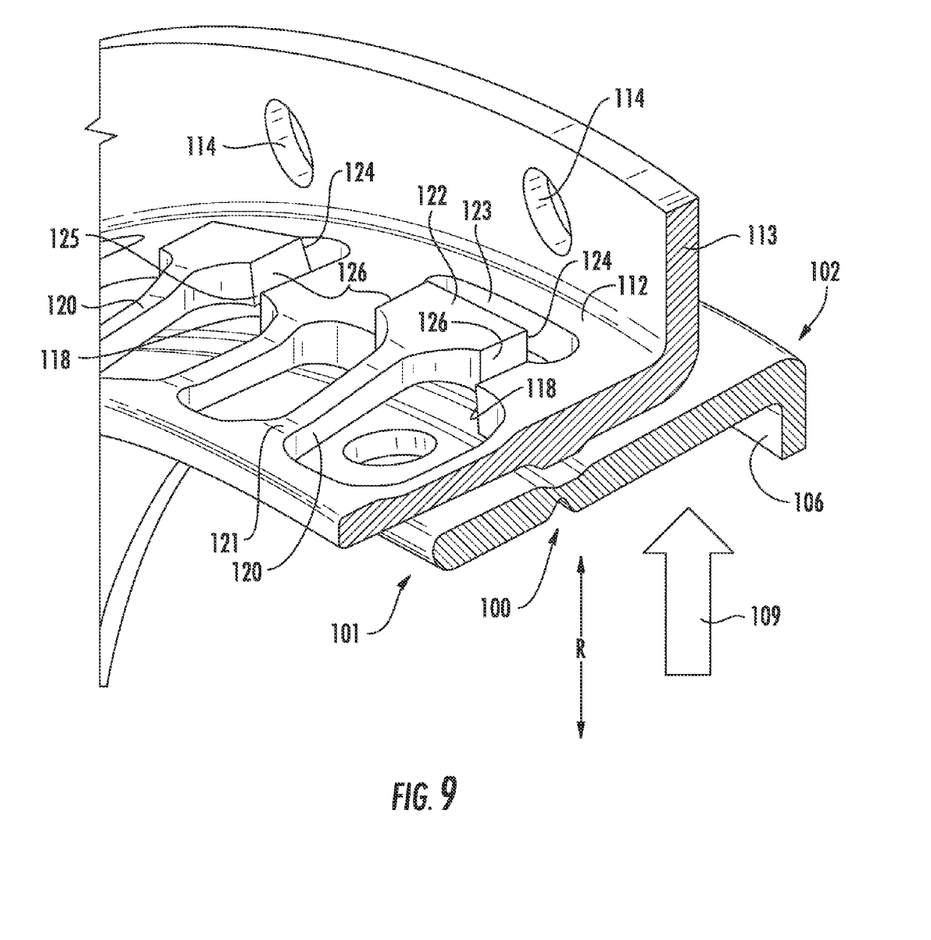
FIG. 9 is a schematic representation of a section of the embodiment of the retention housing component depicted in FIGS. 3-6 upon being subjected to a circumferentially directed force in the direction of the large arrow shown in FIG. 8.

As shown in FIG. 9 for example, the axial gap 123 and the circumferential gaps 125 combine to free the aft end 122 of each respective finger 120 from the aft end 112 of the spring finger housing 110 and the adjacent struts 115 to allow movement of the aft end 122 of each spring finger 120 in the radial direction in a pivoting action anchored at the forward end 121 of each spring finger 120 and independent of the adjacent struts 115 and the aft end 112 of the spring finger housing 110.

Figure 7:
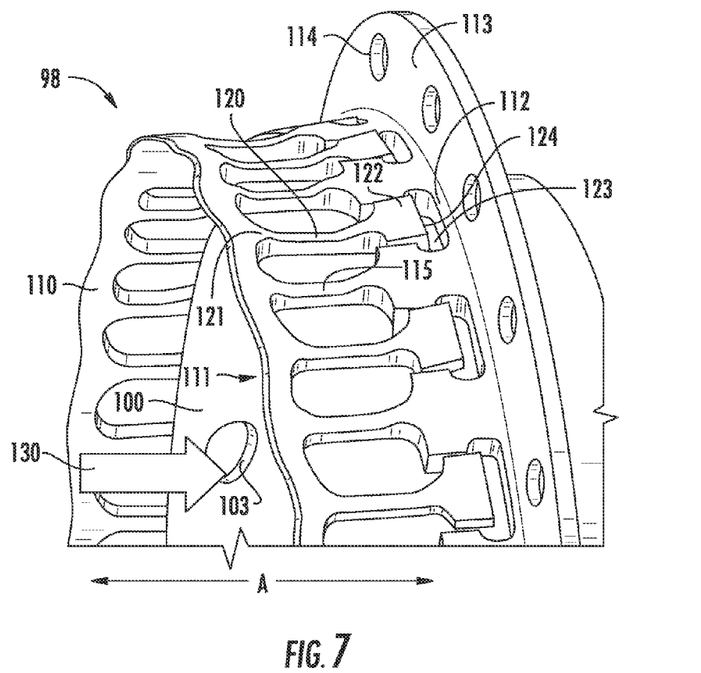
FIG. 7 is a schematic representation of a section of the embodiment of the retention housing component depicted in FIGS. 3-6 upon being subjected to an axially directed force in the direction of the large arrow shown in FIG. 7.
Figure 16:
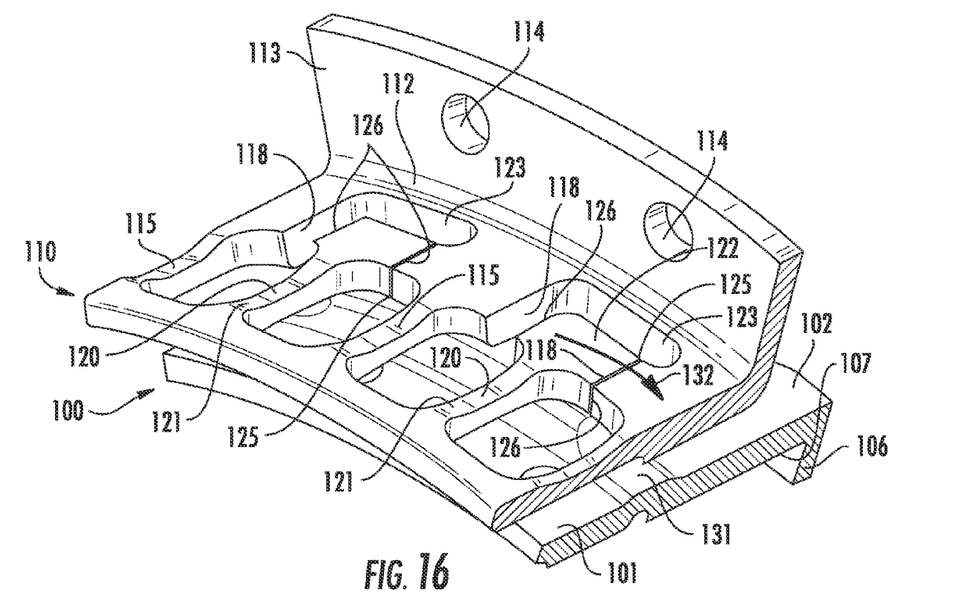
FIG. 16 is a perspective view of a section of another alternative embodiment of a retention housing taken from a view similar to the view shown in FIG. 4.
Figure 17:
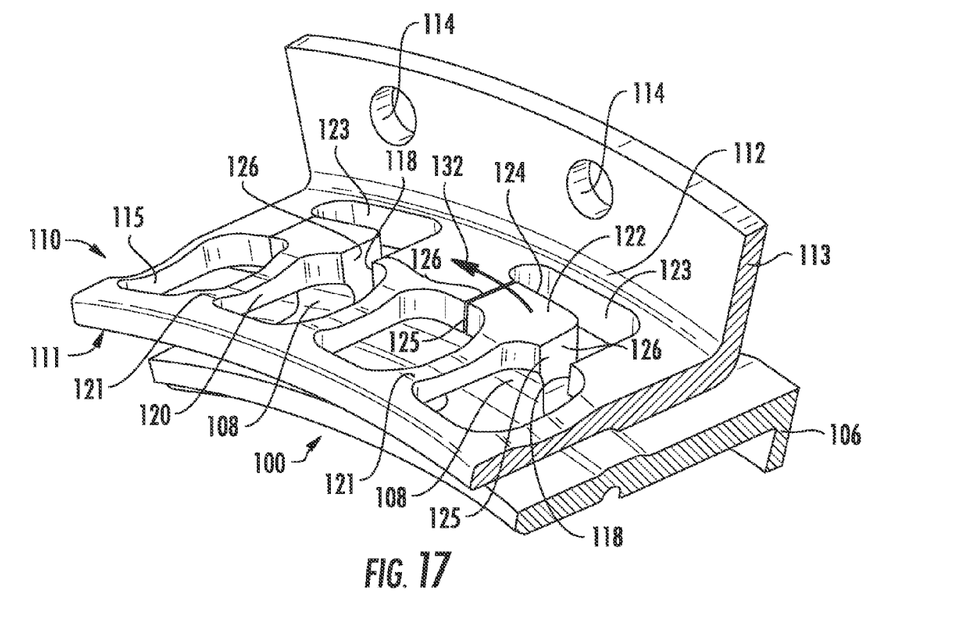
FIG. 17 is a perspective view of a section of still another alternative embodiment of a retention housing taken from a view similar to the view shown in FIG. 4.

As shown in FIGS. 7, 16 and 17 for example, the axial gap 123 and the circumferential gaps 125 combine to free the aft end 122 of each respective finger 120 from the aft end 112 of the spring finger housing 110 and the adjacent struts 115 to allow movement of the aft end 122 of each spring finger 120 in the circumferential direction in a pivoting action anchored at the forward end 121 of each spring finger 120 and independent of the adjacent struts 115 and the aft end 112 of the spring finger housing 110.

Indeed, each of FIGS. 16 and 17 illustrates one of two additional alternative embodiments of the retention housing 98. Each of these embodiments is specifically configured to compensate for an anticipated unidirectional torque of the retention housing 98 in either a clockwise direction or a counterclockwise direction. Thus, between one of the axially extending side edges 126 of the aft end 122 of each finger 120 and the opposing axial edge 118 of the adjacent strut 115, there will be a large machined circumferential gap 125 on the order of the size of the axial gap 123 and contiguous with the axial gap 123. This relatively large circumferential gap 125 results in a concomitant reduction in the weight of the retention housing 98. However, the opposite side edge 126 will define with its opposing axial edge 118 of the other adjacent strut 115 a relatively smaller circumferential gap 125. This relatively smaller circumferential gap 125 on the order of the 5 thousandths of an inch to 20 thousandths of an inch circumferential gap 125 depicted in FIGS. 3-11 for example will enable the finger 120 to act as a unidirectional bumper when the retention housing 98 is torqued in a direction that closes the relatively smaller circumferential gap 125. Thus, referring to FIG. 16 for example, the arrow designated 132 indicates the movement of the finger 120 in the clockwise direction relative to the finger housing 110 when the finger housing 110 experiences a torque in the counterclockwise direction. Similarly, referring to FIG. 17 for example, the arrow designated 132 indicates the movement of the finger 120 in the counterclockwise direction relative to the finger housing 110 when the finger housing 110 experiences a torque in the clockwise direction.

Desirably, the spring finger housing 110, the bridge webs 108 and the ball bearing housing 100 are formed as a monolithic structure. With this configuration of separation between the struts 115 and the ball bearing housing 100, movements of the HP spool 34 in the radial direction (R) during a liberated blade event as schematically shown in FIG. 9 by the bold arrow 109 are damped by the fingers 120 having their forward ends 121 anchored to the forward end 111 of the spring finger housing 110 and having their aft ends 122 free to move in the radial direction (along with the radial movement of the ball bearing housing 100) with respect to the forward ends 121 of the spring finger housing 110.

During normal engine operation, the ball bearing assembly 90 acts to retain the axial position of the HP spool 34, and the associated roller bearing assembly 80 acts to provide radial damping of the fan/rotor system. In the embodiment shown in FIGS. 4-6 for example, a radial bumper gap is defined between the aft end 102 of the ball bearing housing 100 and the overlying inner surface 87 of the interface hardware 86 that is connected to the outer ring 84 of the roller bearing 80 as schematically shown in FIG. 2 for example. The size of this radial bumper gap is controlled to absorb the anticipated relatively small radial deviations of the HP spool 34 and typically would have dimensions within a range on the order of 5 thousandths of an inch to 20 thousandths of an inch. Similarly, in an alternative embodiment shown in FIGS. 10 and 11 for example, there is no need for interface hardware 86 as depicted in FIGS. 2, 5 and 6.

However, as schematically shown in FIGS. 10 and 11 for example, the radial gaps 127 between the inner edge 128 of each strut 115 and the opposing edge 129 of the ball bearing housing 100 is controlled to absorb the anticipated relatively small radially directed deviations of the HP spool 34 and typically would have dimensions within a range on the order of 5 thousandths of an inch to 20 thousandths of an inch.

Figure 8:
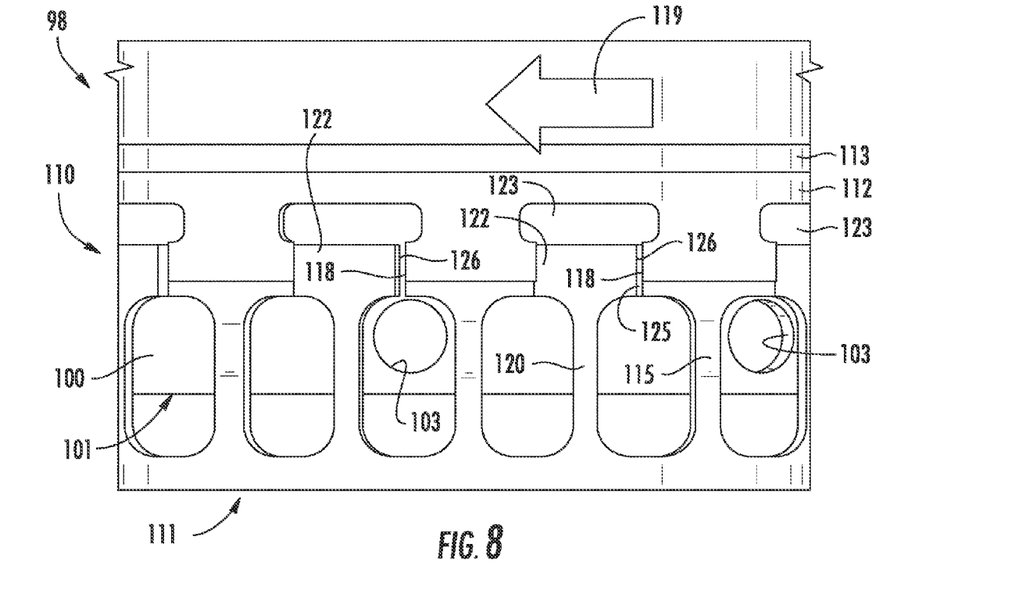
FIG. 8 is a schematic representation of a section of the embodiment of the retention housing component depicted in FIGS. 3-6 upon being subjected to a circumferentially directed force in the direction of the large arrow shown in FIG. 8.

However, during a failure mode that results from either a liberated fan blade, a liberated compressor blade or a liberated turbine blade, very high radial loads close the damper gap in the embodiment depicted in FIGS. 5 and 6. Similarly, in the embodiment depicted in FIGS. 10 and 11, very high radial loads close the radial gap 127. In both embodiments, the very high radial loads create a harmonic drive effect that loads the spring fingers 120 in torsion as schematically indicated in FIG. 8 by the bold arrow 119. This torsion load on the ball bearing 90 and its retention housing 98 results in an opposing sinusoidal load distribution that tends to twist the spring fingers 120 as shown in FIG. 8. However, this twisting becomes damped when the side edges 126 of the fingers 120 move a sufficient distance in the circumferential direction (indicated by the bold arrow designated 119 in FIGS. 8 and 132 in FIGS. 16 and 17) to close the respective circumferential gaps 125 on one of the opposite axially extending sides of each respective finger 120 and come into contact with the respective opposing side edges 118 of the respective adjacent struts 115. The size of this circumferential gap 125 on the opposite axially extending sides of each finger 120 widen commensurately by moving the same distance away from the respective opposing side edges 118 of the respective adjacent struts 115. When not under these sorts of torsion loads, each circumferential gap 125 is controlled to absorb the anticipated relatively small circumferentially directed movements that are anticipated to twist the spring finger housing 110 and thus each relatively smaller circumferential gap 125 typically would have dimensions within a range on the order of 5 thousandths of an inch to 20 thousandths of an inch.

FIG. 7 schematically illustrates the effect of an axial thrust load applied to the ball bearing 90 (FIG. 2). The axial thrust load is schematically represented by the bold arrow designated by the numeral 130 and is a force that moves from the forward end to the aft end of the retention housing 98. The application of this axial thrust load 130 is absorbed by the retention housing 98 by virtue of the aftward movements of the fingers 120 that is permitted by the axial gap 123 that exists between the aft edge 124 of each finger 120 and the aft end 112 of the spring finger housing 110. The breadth of the axial gap 123 in the embodiment depicted in FIGS. 4-6 is quite a bit larger than the axial gap 123 in the embodiment depicted in FIGS. 10 and 11. In the latter, the axial gap 123 is controlled over a range on the order of 5 thousandths of an inch to 20 thousandths of an inch.

Figure 12:
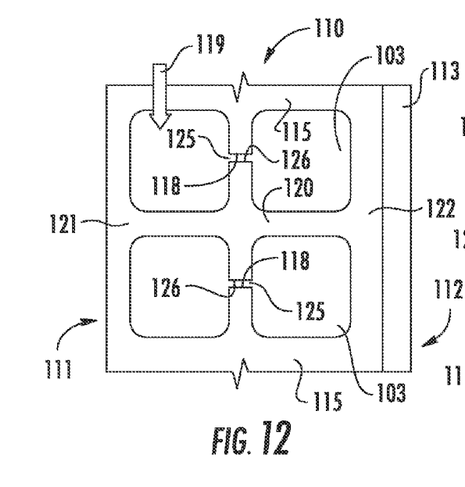
FIG. 12 is a top plan view of another alternative embodiment of a retention housing taken from a view sighting along the radial direction (R) before the application of a circumferentially directed force that is schematically represented by the large arrow.
Figure 13:
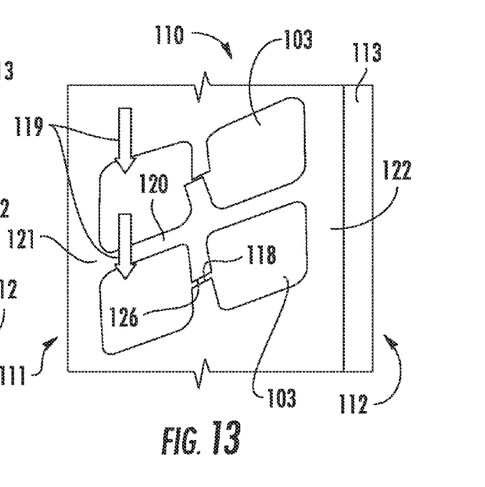
FIG. 13 is a top plan view of the alternative embodiment in FIG. 12 taken from a view sighting along the radial direction (R) after the application of a circumferentially directed force that is schematically represented by the two large arrows.
Figure 14:
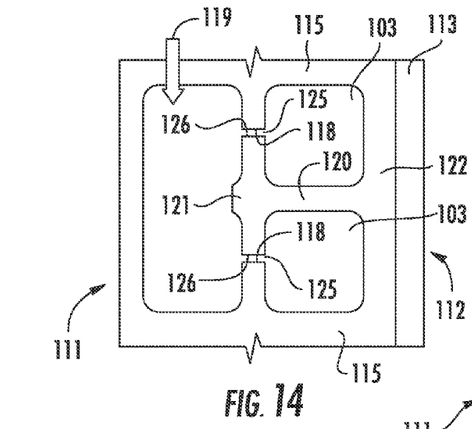
FIG. 14 is a top plan view of another alternative embodiment of a retention housing taken from a view sighting along the radial direction (R) before the application of a circumferentially directed force that is schematically represented by the large arrow.

Each of FIGS. 12, 13, 14 and 15 schematically depicts two alternative configurations of the spring finger housing 110 taken from a perspective above the spring finger housing 110 and looking radially downward at the outer surface of a small section of the spring finger housing 110. Each of FIGS. 12 and 14 depicts the situation before the effects of the torsion load, which schematically is represented by the bold arrows designated by the numeral 119.

In the embodiment depicted in FIGS. 12 and 13, both the forward end 121 and the aft end 122 of each finger 120 are connected to the rest of the spring finger housing 110, just like the struts 115. In this way, the spring finger housing 110 can be reinforced against an axial load, which schematically is indicated by the bold arrow designated 130 in FIG. 7 for example, and thus help limit the deflection toward the aft direction. However, the circumferential gaps 125 are nonetheless present to absorb the torsional loads 119 that accompany a blade failure event.

Figure 15:
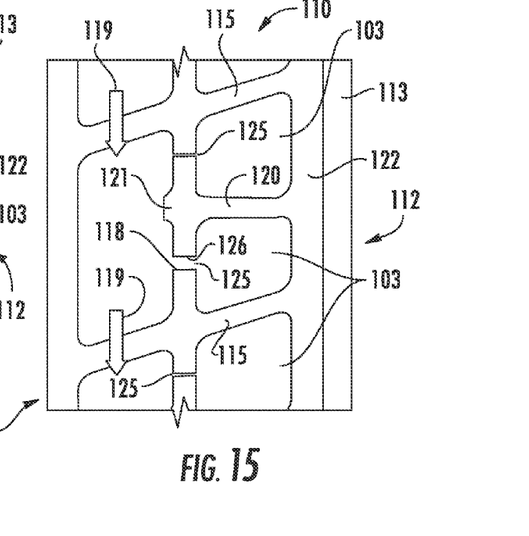
FIG. 15 is a top plan view of the alternative embodiment in FIG. 14 taken from a view sighting along the radial direction (R) after the application of a circumferentially directed force that is schematically represented by the two large arrows.

In the embodiment depicted in FIGS. 14 and 15, only the aft end 122 of each finger 120 is connected to the rest of the spring finger housing 110, just like the struts 115. However, the forward end 121 of each finger 120 is not connected to the forward end 111 of the spring finger housing 110 and thus will not become deflected by the application of an axial load, which schematically is indicated by the bold arrow designated 130 in FIG. 7 for example. In this way, the spring finger housing 110 can be reinforced against axial loads and thus help limit the deflection toward the aft direction. However, the circumferential gaps 125 are nonetheless present to absorb the torsional loads 119 that accompany a blade failure event.

The retention housing 98 with its spring finger housing 110 described herein has several advantages over the prior art. By employing circumferential gaps 125, radial gaps 127 and axial gaps 123 between the individual fingers 120 of the spring finger housing 110 and the retention housing 98 for the ball bearing 90, each of the circumferential gaps 125, radial gaps 127 and axial gaps 123 can be controlled according to the anticipated load in consideration of the size and material composition of the structure of the retention housing 98. The resulting design of the spring finger housing 110 integrates the structural components such that they become capable of withstanding the torsional windup and high radial loads that occur with the sudden increase in load that accompanies a blade failure, whether a fan blade, a compressor blade or a turbine blade. Moreover, due to the unique tapered and relatively short design of the spring fingers 120 and struts, the amount of axial and radial space needed for the spring finger housing 110 is reduced along with a concomitant reduction in the weight of the retention housing 98 while affording a very high torsional load capability to the retention housing 98.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A retention housing for the outer race of a ball bearing for a high pressure spool of a gas turbine engine, the retention housing comprising:
 a ball bearing housing defining a cylindrical inner surface that is disposed equidistantly from an axis of rotation that extends in an axial direction, a radial direction being defined in a direction that is normal to the axial direction;

a spring finger housing disposed radially outwardly from the ball bearing housing and concentrically around the ball bearing housing and defining a forward end disposed axially apart from an aft end;

a bridge web extending in the radial direction between the ball bearing housing and the spring finger housing and connecting the ball bearing housing to the spring finger housing;

the spring finger housing defining a plurality of axially extending struts, each strut defining a forward end and an aft end disposed axially spaced apart from and opposite to the forward end of each respective strut, the plurality of struts forming a monolithic structure with the spring finger housing;

the spring finger housing defining a plurality of axially extending fingers, each finger defining a forward end and an aft end disposed axially spaced apart from and opposite to the forward end of each respective strut, the plurality of forward ends of the fingers forming a monolithic structure with the spring finger housing;

wherein the aft end of each of the plurality of fingers defines an aft edge that is spaced apart from the aft end of the spring finger housing and defines an axial gap between the aft edge of the respective finger and the aft end of the spring finger housing; and wherein the aft end of each of the plurality of fingers defines a pair of axially extending side edges that are circumferentially spaced apart from each other, wherein each side edge of the aft end of each finger is spaced apart from an opposing pair of axially extending side edge of a respective adjacent strut at the aft end of the spring finger housing and defines a circumferential gap between the respective side edge of the respective finger and the respective opposing side edge of the respective strut at the aft end of the spring finger housing.

2. The retention housing of claim 1, wherein a radial gap is defined between each strut and an opposing surface of the ball bearing housing.

3. The retention housing of claim 1, wherein each finger includes an intermediate portion disposed between the forward end and the aft end of each finger, and the intermediate portion of each finger is tapered with respect to the forward end and the aft end of each finger.

4. The retention housing of claim 3, wherein each strut includes an intermediate portion disposed between the forward end and the aft end of each strut, and the intermediate portion of each strut is tapered with respect to the forward end and the aft end of each strut.

5. The retention housing of claim 4, wherein the intermediate portion of each finger is thicker than the intermediate portion of each strut.

6. The retention housing of claim 1, wherein each strut includes an intermediate portion disposed between the forward end and the aft end of each strut, and the intermediate portion of each strut is tapered with respect to the forward end and the aft end of each strut.

7. The retention housing of claim 1, wherein the spring finger housing, the bridge web and the ball bearing housing are formed as a monolithic structure.

8. The retention housing of claim 1, wherein the struts and the fingers are interdigitated in a circumferential direction around the spring finger housing.

9. The retention housing of claim 8, wherein single ones of the fingers alternate with single ones of the struts as one proceeds circumferentially around the spring finger housing.

10. The retention housing of claim 1, wherein the bridge web connects the ball bearing housing to the plurality of fingers of the spring finger housing.

11. The retention housing of claim 1, wherein the bridge web is connected to the spring finger housing closer to the axial midpoint of the spring finger housing than to either the forward end or the aft end of the spring finger housing.

12. The retention housing of claim 1, further comprising an annular mounting flange extending radially outwardly from the aft end of the spring finger housing.

13. The retention housing of claim 12, wherein the spring finger housing and the annular mounting flange are formed as a monolithic structure.

14. The retention housing of claim 1, wherein for the aft end of each finger, the axial gap and the circumferential gaps combine to free the aft end of each respective finger from the aft end of the spring finger housing.

15. A gas turbine engine, comprising:
a fan including a plurality of blades extending radially from a hub and rotatable about a first axis of rotation defined centrally through the hub;
a compressor disposed downstream from the fan;
a turbine disposed downstream of the compressor;
a rotatable input shaft mechanically coupling the compressor to rotate in unison with the turbine;
and an engine envelope surrounding the fan, the compressor, and the turbine;
a ball bearing having an inner race rotatable with respect to an outer race, wherein the inner race is non-rotatably coupled to the input shaft; and
a retention housing that non-rotatably couples the engine envelope to the outer race of the ball bearing; and
wherein the retention housing further including:
a ball bearing housing defining a cylindrical inner surface that is disposed equidistantly from an axis of rotation that extends in an axial direction, a radial direction being defined in a direction that is normal to the axial direction,
a spring finger housing disposed radially outwardly from the ball bearing housing and concentrically around the ball bearing housing and defining a forward end disposed axially apart from an aft end,
a bridge web extending in the radial direction between the ball bearing housing and the spring finger housing and connecting the ball bearing housing to the spring finger housing,
the spring finger housing defining a plurality of axially extending struts, each strut defining a forward end and an aft end disposed axially spaced apart from and opposite to the forward end of each respective strut, the plurality of struts forming a monolithic structure with the spring finger housing,
the spring finger housing defining a plurality of axially extending fingers, each finger defining a forward end and an aft end disposed axially spaced apart from and opposite to the forward end of each respective strut, the plurality of forward ends of the fingers forming a monolithic structure with the spring finger housing, and
wherein the aft end of each of the plurality of fingers defines an aft edge that is spaced apart from the aft end of the spring finger housing and defines an axial gap between the aft edge of the respective finger and the aft end of the spring finger housing,
wherein the aft end of each of the plurality of fingers defines a pair of axially extending side edges that are circumferentially spaced apart from each other, wherein each axial side edge of the aft end of each finger is spaced apart from the aft end of the spring finger housing and defines a circumferential gap between the respective axial side edge and the aft end of the spring finger housing.

16. The gas turbine engine of claim 15, wherein a radial gap is defined between each strut and an opposing surface of the ball bearing housing.

17. The gas turbine engine of claim 15, wherein each finger includes an intermediate portion disposed between the forward end and the aft end of each finger, and the intermediate portion of each finger is tapered with respect to the forward end and the aft end of each finger.

18. The gas turbine engine of claim 15, wherein each strut includes an intermediate portion disposed between the forward end and the aft end of each strut, and the intermediate portion of each strut is tapered with respect to the forward end and the aft end of each strut.

19. The gas turbine engine of claim 17, wherein each strut includes an intermediate portion disposed between the forward end and the aft end of each strut, and the intermediate portion of each strut is tapered with respect to the forward end and the aft end of each strut.

20. The gas turbine engine of claim 19, wherein the intermediate portion of each finger is thicker than the intermediate portion of each strut.

* * * * *